UNITED STATES PATENT OFFICE.

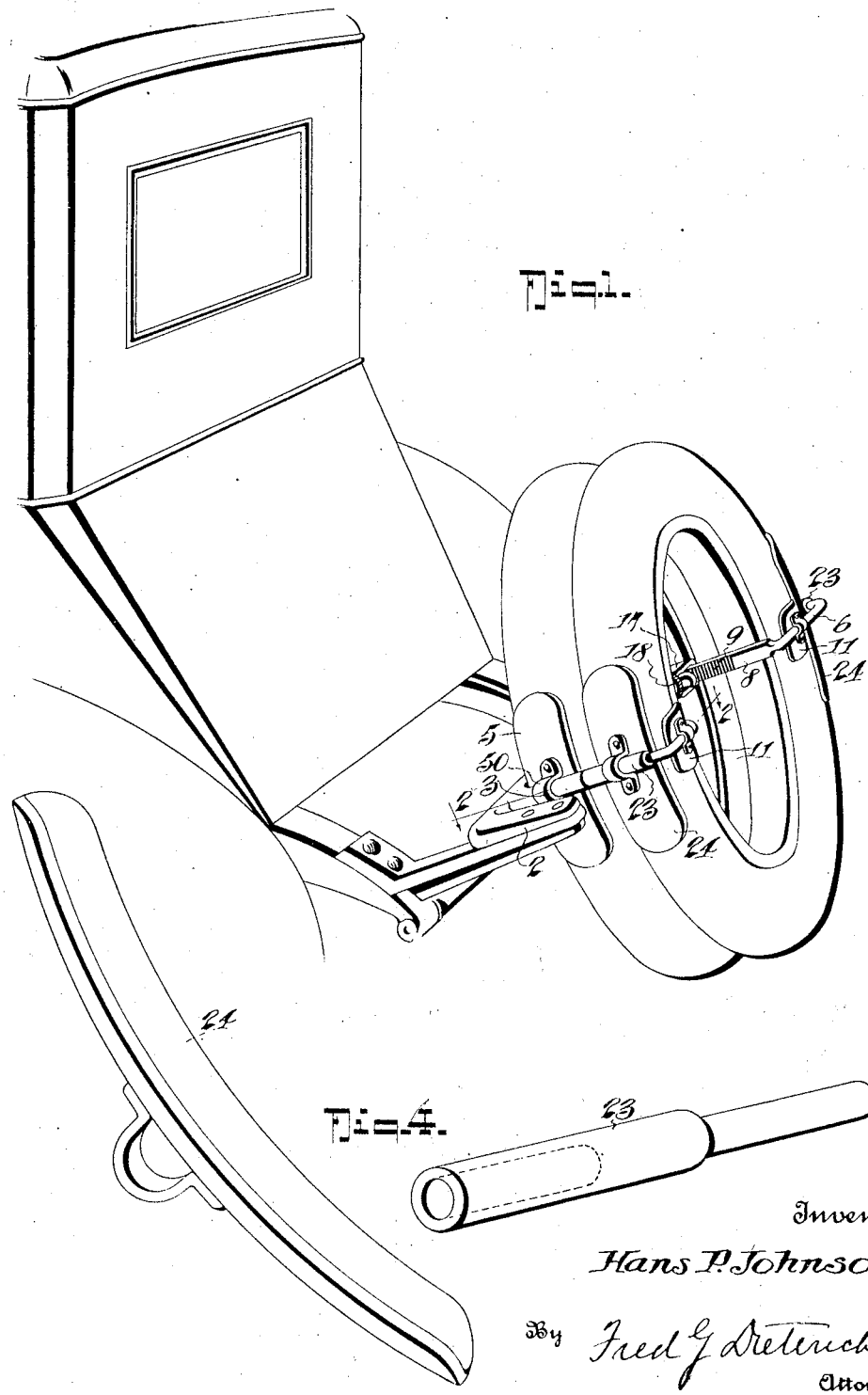

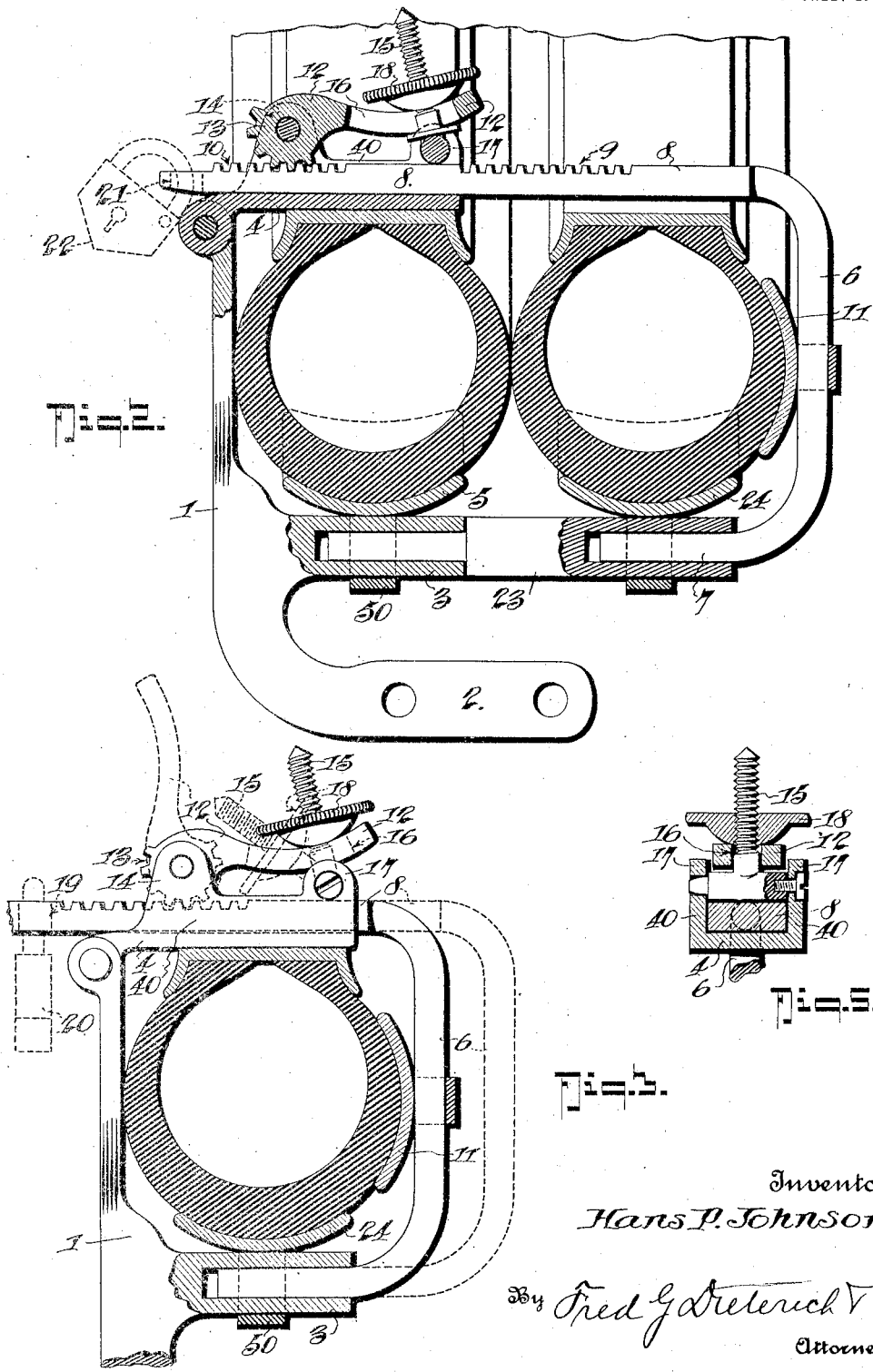

HANS P. JOHNSON, OF RACINE, WISCONSIN.

AUTO TIRE-CARRIER.

1,331,926.     Specification of Letters Patent.     Patented Feb. 24, 1920.

Application filed June 14, 1919. Serial No. 304,233.

*To all whom it may concern:*

Be it known that I, HANS P. JOHNSON, a citizen of the United States, residing at Racine, in the county of Racine and State of Wisconsin, have invented certain new and useful Improvements in Auto Tire-Carriers, of which the following is a specification.

My present invention has reference to improvements in means for carrying one or more extra tires on motor vehicles and particularly seeks to provide an improved means of the general character stated, and though primarily designed for holding a single extra tire, it includes a simple and easily adjusted attachment adapted for se-easily securing a second extra tire in close relation with the said first mentioned extra tire.

Another object of my invention is to provide a tire carrier in which the parts are adapted for being compactly arranged which may be quickly manipulated for engaging one or two tires and holding them locked in position so that they are secure against theft.

With other objects in view that will hereinafter be explained, my invention embodies, in a tire carrier, the peculiar features of construction and novel combination of parts that will fully appear in the following detailed description, be specifically pointed out in the appended claims and illustrated in the accompanying drawings, in which:

Figure 1 is a perspective view of my tire carrier, the same being shown as supporting two tires, so much of a motor vehicle being indicated as is necessary to illustrate a practical application of my invention.

Fig. 2 is a cross section of the carrier, taken substantially on the line 2—2 on Fig. 1.

Fig. 3 is a view, similar to Fig. 2, the parts being adjusted for holding a single tire.

Fig. 4 is a perspective view of the extension piece and the supplemental clamping member used for holding the second tire in place.

Fig. 5 is a detail cross section of the rockable lever and the clamp devices that hold the said lever to its adjusted position.

Ordinary tire holders are usually arranged to carry but a single tire.

My invention, while primarily designed for carrying but a single spare tire is arranged for being easily supplied with an attachment comprising essentially a lengthening bar and a second clamping member, and being thereby adjusted for carrying two spare tires without requiring change or alteration of the parts, when used for holding but a single spare tire.

While I shall describe in detail the parts that constitute but a single outfit or tire carrier, it is to be understood that, in practice, two of such outfits, one at each side of the tire, are to be used when operatively applying my invention to a motor vehicle.

Each of the tire carrying or clamping devices comprises an angular shaped bracket iron 1, one end of which terminates in an apertured arm 2 which, in practice, is suitably shaped for being bolted upon the vehicle chassis or at such part of the vehicle body where it may be desired to support the additional spare tire or tires.

Bracket member 1, in practice, is arranged to extend across one side of the tire and constitutes a bearing member against which the tire rests, when it is clamped in place in the manner presently explained.

At a point outside of the plane of the tread face of the tire the bracket member 1 has an integral horizontally projected tubular extension or socket 3 and to the other end of the said member 1 is hinged a flat face clamping member 4, the latter being adapted for extending across the inner face of the tire rim and for being tightly clamped against the said rim in the manner that will be clearly understood by referring to Figs. 2 and 3 of the drawings.

5 designates a clamping shoe that has an attached ear 50 for slidably engaging the tubular extension or socket 3.

6 designates an adjustable clamping yoke, one end 7 of which is adapted for being slid into the tubular socket 3 and the other end of which constitutes a clamping member that terminates in an adjusting lever 8.

By referring now to Figs. 2 and 3, it will be noticed that the lever 8 is held for slidable engagement with the clamping member 4 between the angled side flanges 40, 40, thereof, and the outer face of the said lever 8 has a pair of separated rack surfaces 9 and 10, the inner one of which is brought into use when the device or appliance is particularly adapted for holding and clamping a single extra tire in the desired position upon the vehicle.

11 designates a clamping plate that is slidably mounted on the cross portion of the yoke 6 and in the operative application of my device, the said plate engages one side of the tire and constitutes a companion clamp, with respect to the bracket arm 1 against which the other side of the tire rests.

For conveniently pulling the plate 11 inwardly, to effect a tight clamping engagement of the tire between it and the bracket arm 1, a rockable lever 12 is provided, which lever has a rack segment 13, that is pivotally mounted between the pair of opposing ears 14—14 formed on the end of the side flanges 40 of the hinged member 4 and which engages with either of the separated rack surfaces 9 or 10.

By providing a lever 12 having a segmental rack 13 for engaging the rack portions of the lever 8, a powerful compression may be imparted to the clamping plate 11 for firmly holding the tire against the carrying bracket 1.

For holding the lever 12 locked to its adjusted positions, after having effected the desired shifting of the clamping members that hold the tire to its tightly clamped position, the said lever 12 has a longitudinal slot 16 for closing over the outer end of a screw bolt 15 whose inner end is pivotally connected between an opposing pair of ears 17—17 on the side flanges 40 of the member 4, as shown.

18 designates a hand screw wheel that engages the outer end of the screw bolt 15 and serves to hold the lever 12 locked to its adjusted position, as shown.

The locking or rack lever 8 has an aperture 19 near the innermost rack portion which receives a padlock 20 for holding the parts against being taken apart and from connection with the tire. A similar hole 21 is located in the rack lever at the outermost end thereof for receiving a lock 22, when the device is adjusted for carrying two tires, as shown in Fig. 1.

So far as described, the complete construction of my tire carrier and holder, the manner in which the parts are assembled for use and the manner in which a single tire may be conveniently, attached to the chassis of the vehicle frame or to the body and held with safety against theft will be readily apparent to those familiar with automobile attachments.

By making the rack lever 8 of some length and with a pair of independently used rack portions, the said lever can be readily extended through the upper end of the hinged guide member 4 to permit of placing another or second tire against the first tire, as shown in Figs. 1 and 3.

When a second extra tire is to be carried, an extension socket 23 is fitted in the other socket, see Fig. 3, and an extra clamping shoe 24 for engaging the second tire is slid onto the socket piece 23, after which the yoke 6 with the rack bar is slid out with the clamp plate 11 and swung over the outer side of the second tire. The short end of the yoke is then slipped into the second or extension socket 23, after which, by proper manipulation of the rack lever 12 now engaging the other or outermost rack portion on the lever 8, the parts may be adjusted to securely clamp and hold the tires onto the oppositely disposed securing devices.

It will be apparent from the foregoing description taken in connection with the drawings that I have provided a simple and easily manipulated device, whereby an extra or a plurality of extra tires may, with great facility, be securely attached either to the chassis or the body of the vehicle and held secure against theft.

What I claim is:

1. An automobile clamp and carrier comprising a bracket having one end adapted for attachment to the vehicle frame or body, a guide on the other end of the bracket, a yoke-shaped clamp slidably adjustable through the guide and means coöperative with the clamp and the guide for shifting the yoke-shaped member to cause it to hold one or more tires clamped against the bracket and each other, the said means comprising rack surfaces on one member of the yoke frame and an operating lever having a toothed head for engaging the said rack surfaces, the said head being pivotally mounted in the hinged guide.

2. An automobile clamp and carrier comprising a bracket having one end adapted for attachment to the vehicle frame or body, a guide on the other end of the bracket, a yoke-shaped clamp slidably adjustable through the guide and means coöperative with the clamp and the guide for shifting the yoke-shaped member to cause it to hold one or more tires clamped against the bracket and each other, the said means comprising rack surfaces on one member of the yoke frame and an operating lever having a toothed head for engaging the said rack surfaces, the said head being pivotally mounted in the hinged guide, and further means for holding said operating lever and the rack portion of the yoke frame locked to the tire clamping position.

3. An automobile tire clamp and carrier comprising a bracket including a portion that serves as a rest and a clamp member for engaging with the inner face of the tire, one end of the bracket being adapted for attachment to the chassis or body of the vehicle, a guide hinged to the outer or free end of the bracket adapted to swing over the outer face of the tire, a yoke-shaped clamp, one member of which constitutes an adjusting lever, the latter being slidably engageable with the hinged guide, the other end of the said yoke frame being adapted for extending over the tread face of the tire, a tire engaging shoe mounted on the said other end, and means for adjusting the yoke-shaped lever, the said means including devices for holding the said other means locked to the lever adjusted position.

4. An automobile tire clamp and carrier comprising a bracket having an end adapted for being attached to the vehicle frame or body, a guide hinged to the other end of the bracket to close against the inner face of the tire rim, a socket projected from the bracket, a yoke-shaped clamp, one member of which constitutes a lengthening lever, the latter being slidable through the guide, the other member of the yoke-shaped clamp being adapted for entering the socket on the bracket, and means for adjusting the yoke-shaped clamp to and from the bracket, the said means being mounted on the hinged guide.

5. An automobile tire clamp and carrier comprising a bracket having an end adapted for being attached to the vehicle frame or body, a guide hinged to the other end of the bracket to close against the inner face of the tire rim, a socket projected from the bracket, a yoke-shaped clamp, one member of which constitutes a lengthening lever, the latter being slidable through the guide, the other member of the yoke-shaped clamp being adapted for entering the socket on the bracket and means for adjusting the yoke-shaped clamp to and from the bracket, the said means being mounted on the hinged guide, and a lengthening socket connectible with the bracket socket with which the yoke lever connects, when adjusted for clamping two tires, and clamp shoes on the yoke lever and the lengthening socket that engage the tread face of the tires, when held to the clamped position.

6. An appliance for the purpose described comprising a bracket having one end adapted for being attached to the frame or body of the vehicle, the other end constituting a bar against which to clamp a tire, the said tire portion having a socket extension adapted for extending over the tread face of a tire, when the latter is applied thereagainst, the said socket extension including a removable lengthening socket member, a clamp shoe on the socket extension and a like shoe on the removable socket member, a yoke-shaped clamp, one end of which is adapted for engagement with either the socket projected from the bracket or the lengthening socket, and means connecting the yoke-shaped clamp and the bracket for extending the said yoke-shaped clamp to fit over a single or over a pair of tires, and devices for holding the yoke-shaped lever extension means locked to their adjusted positions.

HANS P. JOHNSON.